United States Patent [19]

Lauren

[11] Patent Number: 4,576,206
[45] Date of Patent: Mar. 18, 1986

[54] PIPE INSULATION SLEEVE

[76] Inventor: Henning J. E. Lauren, Regngagen 8, SF-21600 Parainen, Finland

[21] Appl. No.: 636,077

[22] Filed: Jul. 31, 1984

Related U.S. Application Data

[63] Continuation-in-part of Ser. No. 394,286, Jul. 1, 1982, abandoned.

[30] Foreign Application Priority Data

Jul. 6, 1981 [FI] Finland .................................. 812123

[51] Int. Cl.$^4$ .............................................. B32B 17/04
[52] U.S. Cl. ...................................... 138/149; 138/151
[58] Field of Search ................... 138/141, 149, 151; 174/121 SR, 124 GC

[56]     References Cited

U.S. PATENT DOCUMENTS

| | | | |
|---|---|---|---|
| 2,308,607 | 1/1943 | Jackson | 138/141 X |
| 2,405,330 | 8/1946 | Ryder | 138/149 X |
| 2,776,231 | 1/1957 | Brown | 138/141 |
| 3,053,715 | 9/1962 | Labino | 138/141 |
| 3,336,951 | 8/1967 | Huelster | 138/141 X |
| 3,687,170 | 8/1972 | Malone et al. | 138/151 X |
| 4,201,247 | 5/1980 | Shannon | 138/141 |
| 4,459,333 | 7/1984 | Murphy | 138/149 X |

FOREIGN PATENT DOCUMENTS

| | | | |
|---|---|---|---|
| 377601 | 6/1964 | Switzerland | 138/149 |
| 637384 | 6/1952 | United Kingdom | 138/149 |

Primary Examiner—Stephen Marcus
Assistant Examiner—Mark Thronson
Attorney, Agent, or Firm—Bucknam and Archer

[57] ABSTRACT

A pipe insulation sleeve is made of mineral wool bound by a thermosetting binder and comprising an outer insulating layer consisting of a slab of mineral wool hardened throughout, the outer layer having a plurality of radial slits taken out from its inwards-turned surface, which slits run axially and are essentially closed and originally of V-shaped form, and an inner layer of mineral wool bonded to the outer layer by a thermosetting binder and of such thickness and density that it is in itself rigid and at the same time imparts rigidity to said outer layer. The insulating sleeves according to the invention are particularly advantageous when the inner diameter is 300 mm or greater and the thickness is more than 100 mm. A method and arrangement for production of the pipe insulation sleeve is also described.

3 Claims, 3 Drawing Figures ical form which is adapted to the mantle of the tube to be insulated. The closing or sealing will take place through the hardening of the binding agent and it can effectuated by adding binding agent onto the inner surface of the main layer after the slitting operation. It is this closing of the main layer to

PIPE INSULATION SLEEVE

This application is a continuation-in-part, of application Ser. No. 394,286, filed July 1, 1982, now abandoned.

BACKGROUND OF THE INVENTION

1. Field of the Invention

The present invention relates to a pipe insulation sleeve made of mineral wool bound by a thermosetting binder. The term "mineral wool" is here used to mean any kind of wool of mineral material, such as glass wool, rock wool, slag wool. The invention further relates to a method of making such a pipe insulation sleeve and to an arrangement for carrying out the method.

2. Description of the Prior Art

Mineral-wool pipe insulation sleeves are customarily made by winding a thin sliver of raw mineral wool impregnated with a thermosetting binder around a tubular core of the desired diameter until the desired insulation thickness is attained, and then hardening the raw insulation sleeve at a temperature of approx. 200° C., for example by blowing hot air through the wool via the core. The binder hardens, thereby fixing the shape of the sleeve.

The cylindrical sleeve is usually slit in the longitudinal direction so as to produce two halves connected to each other along one side. In installation the two halves are forced apart and pushed over the pipe, after which they are bound together in suitable fashion and possibly also fitted with an outer covering. Larger diameter insulation sleeves can be divided into two or three separate parts in order to achieve a smaller packing and transport volume.

The manufacture of small and medium-sized pipe insulation sleeves with an inside diameter less than about 300 mm and an insulation thickness less than about 100 mm can be carried out fast and efficiently on highly automated machines.

When, however, large pipe insulation sleeves are concerned, such as those for district heating mains which can often have insulation thicknesses greater than 100 mm, the production capacity is low because the hardening times become long and also the winding of the sliver of mineral wool onto cores of large diameter is time consuming.

SUMMARY OF THE INVENTION

Accordingly it is an object of the invention to provide a pipe insulation sleeve whch has properties fully comparable with pipe insulation sleeves produced by methods known heretofore, but which, when pipe insulation sleeves for pipe diameters greater than 300 mm and insulation thicknesses greater than 100 mm are concerned, can be produced considerably faster and more efficiently than has been possible with previously known production processes.

The problems of the prior art have been solved by producing two semi-cylindrical halves of the sleeve from a slab of mineral wool having the desired thickness of the sleeve and being hardened all through by a thermosetting binder. The surface which will form the inner surface of the sleeve is provided with a number of V-shaped slits which enable the slab to be bent into a semi-cylindrical form when being inserted into an external mould having a diameter corresponding to the outer diameter of the sleeve. The originally flat slab which has been bent to a semi-cylindrical shape obtains its desired permanent semi-cylindrical form by means of a rather thin inner layer of a mineral wool web containing an unhardened thermosetting binder. This rather loose layer is placed onto the inner surface of the main layer, whereafter an inner mould with a mould surface of semicircular cross-section of the same diameter as the outer surface of the pipe to be insulated is brought into a position concentric with the outer mould and is pressed against the outer mould thereby compressing the inner layer into a predetermined thickness. At the same time, hot air is caused to blow through the surface of the inner mould and into the inner layer of the sleeve. The unhardened thermosetting binder of the inner layer is thereby hardened and effects a bond between the inner layer and the outer layer. The structure of the inner layer has through the hardening and through the compressing action become rigid and contributes thereby to the rigidity of the whole sleeve. Obtaining of the semi-cylindrical form and of an efficient bond between the layers can be facilitated by including an additional layer of binder material onto the slitted inner surface of the main layer before inserting it into the outer mould.

The ammount of unhardened binding agent included in the inner layer should not be paid attention to. The loose inner layer containing unhardened binder agent is pressed from a thickness of some 50 mm to a thickness of some 15–20 mm, whereby the density is considerably raised. The density of the inner layer will be about double as compared with the density of the outer main layer. This is advantageous as the inner layer will be in contact with the high temperature of the tube to be insulated. The high density of this inner layer will contribute to the rigidity of the insulation sleeve, although this is not an object of the inner layer.

The inner layer which is fairly pliable when laid onto the inner face of the main layer has a good capability to conform to the inner surface of the main layer which has a polygonal shape because of the slits being cut into said surface and to effect an efficient bonding between the two surfaces. The polygonal shape of the inner surface of the main layer cannot be traced in the inner surface of the inner layer but said inner surface has been conformed into an even semi-cylindrical form fitting to the tube to be insulated.

Even if the inner layer contributes to the rigidity of the sleeve, it is not an object of the layer to improve the rigidity of the main layer which has in itself rigidity enough due to the hardened binder contained in said layer.

Instead, one of the main objects of the inner layer is to provide a layer which will conform to the polygonal shape of the inner surface of the main layer mounted into the outer mould. Thanks to the loose structure of the unhardened inner layer, it fills the angular spaces at the points where the slits are closed. The inner surface of the inner layer will get the semi-circular form of the inner mould and will conform to the tube to be insulated.

The most important object of the inner layer is, of course, to provide the closing of the inner surface of the main layer to a semi-circular form which is adapted to the mantle of the tube to be insulated. The closing or sealing will take place through the hardening of the binding agent and it can effectuated by adding binding agent onto the inner surface of the main layer after the slitting operation. It is this closing of the main layer to a semi-circular shape that constitutes the essence of the invention and which makes it possible to use a prehardened mineral wool web of desired thickness for the sleeve and thereby eliminate the time consuming hardening stage of the main layer having the semi-circular form. Instead, hardening of the main layer has been performed in a continuous working web manufacturing machine.

The complete sleeve ready for use thus comprises a main layer constituting the main part of the thickness of the sleeve. The main layer is hardened all through already before starting the producing of the sleeve. The density of the main layer is not transformed in any remarkable way during the pressing and hardening action directed on the inner layer. The inner layer is of mainly the same structure as the main layer but is unhardened when being placed on the inner surface of the main layer. The amount of binder material contained in the inner layer and eventually added thereto before the compressing action is high, which results in an efficient binding. The density of the inner layer has become high through the compressing action and the rigidity of this layer is considerably higher than that of the main layer. This contributes to the rigidity of the sleeve, but does not constitute an object of the invention. The rigidity and density of the main layer is not affected in any remarkable way by the hardening of the inner layer.

Closed slits can be seen in the border surface between the two layers, of which the inner layer has a relatively little thickness as compared with the main layer, maximum some 10–20% thereof, and a greater density in its compressed condition than the outer main layer, while the outer main layer has a high thickness, at least some 80% of the total thickness of the sleeve and a lower density than the inner layer, both layers being bonded by the thermosetting binding agent.

The pipe insulation sleeve according to the invention is characterized in that it comprises an outer insulating layer consisting of a slab of mineral wool hardened all through, which layer features a number of slits taken out from the inner surface and running axially and advantageously originally of V-shaped form, and an inner layer bonded to said outer layer by a thermosetting binder, said inner layer being of mineral wool and of such thickness and density that it is in itself rigid and at the same time contributes to the rigidity of said outer layer.

The aforesaid slits are suitably taken out to a depth of 75–80% of the thickness of said outer layer.

The method according to the invention for making pipe insulation sleeves is characterized in that a number of parallel slits, advantageously of V-shaped form, are made in a slab of mineral wool hardened all through and of the desired thickness, and that said slab is thereafter inserted into and caused to conform to an external mould with a diameter corresponding to the desired outside diameter of the pipe insulation sleeve, whereupon said slits become essentially closed, and that on the inner surface of the thus formed slab is laid a layer of mineral wool containing unhardened binder and that this layer is compressed by means of an inner mould concentric with said outer mould and with a diameter corresponding to the outside diameter of the pipe, whereafter a heating medium is passed through said inner mould in order to harden said binder and bond the compressed layer to the outer layer of hardened mineral wool, whereon said compressed layer is of such density and thickness in its compressed state that it is in itself rigid.

One arrangement for carrying out the method according to the invention is thus characterized in that it comprises an essentially semi-cylindrical outer mould with a diameter corresponding to the desired outside diameter of the pipe insulation sleeve, an inner mould with a cylindrical surface having a diameter corresponding to the desired inside diameter of the pipe insulation sleeve, a means for pressing said inner mould against a mineral-wool material inserted in said outer mould to concentricity with said outer mould, and means for conducting a heating medium from said inner mould to said mineral-wool material.

BRIEF DESCRIPTION OF THE DRAWING

In the accompanying drawing

DESCRIPTION OF THE PREFERRED EMBODIMENTS

Figure 1:
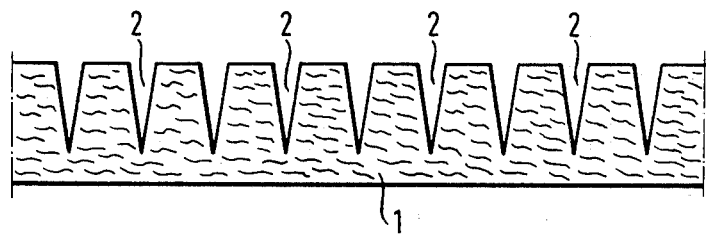
FIG. 1 shows a pipe insulation sleeve in accordance with the invention seen in cross-section perpendicular to the axial direction.

The pipe insulation sleeve shown in FIG. 1 comprises an outer insulating layer 1 consisting of a slab of mineral wool produced in conventional fashion and with a relatively low density, i.e. 75–100 kg/m$^3$ for rock wool and about half that density for glass wool. The outer layer 1 features a number of radial slits 2 running in an axial direction and which are essentially closed, but which originally had the V-shaped form shown in FIG. 2. This V-shaped form is chosen to suit the desired outside diameter of the pipe insulation sleeve, so that the slits close when the slab is bent to a semi-circular shape. In this connection it has been found that a slit depth of 75–80% of the thickness of the slab 1 is suitable. The intervals between adjacent slits 2 are chosen so that a well-centred and circular pipe insulating sleeve is obtained. As a guiding example it may be mentioned that a slab of mineral wool 130 mm thick which is to be formed into a pipe sleeve half with an outside diameter of 700 mm has V-shaped grooves made in it to a depth of 100 mm and at intervals of 80 mm, the grooves being 25 mm wide at their widest point.

The outer layer 1 can also be provided on the outside with a facing, not shown on the drawing, of glass fibre, paper or aluminium foil, which thus forms the outer surface of the pipe insulation sleeve.

On the inner surface of the outer layer 1 and bonded thereto there is an inner layer 3, which also consists of mineral wool but which has such a high density and contains so much thermosetting binder that it is in itself rigid and consequently contributes to the rigidity of the outer layer 1 and thus to the rigidity of the whole pipe insulation sleeve. The inner and outer layers are bonded together by means of the thermosetting binder which is a constituent of them. In order to improve adherence, however, a layer of binder can also be included between the two mineral-wool layers 1 and 3.

Figure 3:
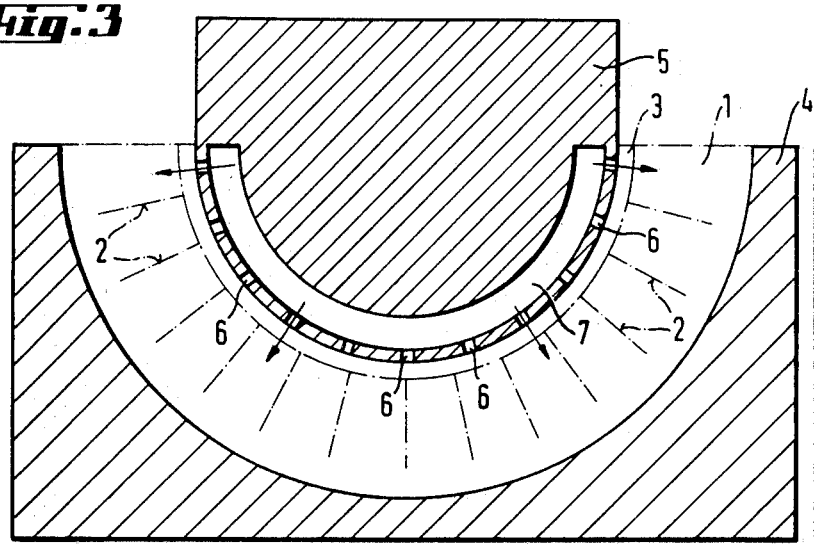
FIG. 3 shows an arrangement used for making the sleeve in a cross-section perpendicular to the axial direction.

The production of the pipe insulation sleeve shown is described with reference to the arrangement which is shown diagrammatically in FIG. 3. This arrangement comprises an outer mould 4 with an essentially semi-circular cross-section corresponding to the desired outside diameter of the pipe insulating sleeve which is to be produced. The arrangement further comprises an inner mould 5 which has a mould surface of semi-circular cross-section and which by any means whatsoever, known per se, can be brought to a position concentric with the outer mould, as shown on the drawing, in which position the distance between the moulds 4 and 5 corresponds to the desired thickness of the pipe insulation sleeve. The mould surface of the inner mould 5 is provided with perforations 6 through which hot air can be blown from the hollow interior 7 of the mould.

Figure 2:
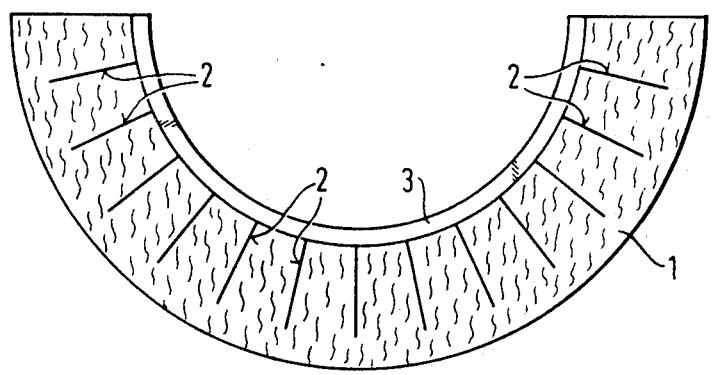
FIG. 2 shows a slab of mineral-wool material as used for making the pipe insulation sleeve.

A slab of mineral wool 1 of the desired thickness is furnished, in the manner described in connection with FIG. 1, with a suitable number of parallel slits 2 running in the longitudinal direction, as shown in FIG. 2. The slab 1 is then inserted in the outer mould 4 and a layer of raw mineral wool containing unhardened binder is laid upon said slab 1. This layer of mineral wool can have, for example, a thickness of approx. 50 mm and a density of approx. 70 kg/m$^3$. The inner mould 4 is then brought to press against the inserted mineral-wool material, the distance between the mould parts 4 and 5 being chosen so that said layer of raw mineral wool is compressed to a thickness of approx. 15–20 mm. At the same time hot air is blown from the inner mould 5 through the perforations 6 to the raw mineral-wool material, thereby in a short time, approx. 20–30 seconds, causing the binder to harden whereupon the layer 3 becomes rigid and is at the same time bonded to the mineral-wool material 1 which is already hardened. In order to increase the adherence between the layers 1 and 3 the slab 1 can be sprayed with a binder after being slit and before the layer of raw material wool is laid on it. The binder also penetrates into the slits 2 and, by holding together the closed slits, helps maintain the semi-circular form of the pipe insulation sleeve which is determined by the rigidity of the inner layer 3.

In principle there is no upper limit to the diameter of pipe insulation sleeves which can be produced by the method described, and such sleeves can be made for pipes of cylindrical containers with a diameter up to several meters. Although the production of pipe insulation halves has been described above, it is also possible to produce elements which are only one-third or one-quarter of the final sleeve and this is to be preferred particularly in the case of large diameters. As the required hardening time is very short even for large pipe insulation sleeves of over 100 mm diameter, the invention makes possible the fast and efficient production of large pipe insulation sleeves. Using previously known production techniques a pipe sleeve of comparable dimensions would require a hardening time of 20–30 minutes. In order to obtain efficient production all that is required in accordance with the invention is a pair of moulds for each dimension and production station to achieve the necessary capacity.

What is claimed is:

1. A pipe insulation sleeve of mineral wool bound by a thermosetting binder, comprising an outer insulating main layer having an inner diameter of at least 300 mm and a thickness of at least 100 mm, a surface forming the inner side of the main layer, and consisting of a slab of mineral wool hardened all through, said slab having a plurality of radial slits extending outwardly in an axial direction from said surface forming the inner side of the main layer, said slits being essentially closed, said surface being a slitted polygonal surface, and an inner layer of mineral wool compressed into contact with said main layer, said inner layer being free of radial slits and containing a thermosetting binder, said inner layer being bonded to said slitted polygonal surface of said main layer by said thermosetting binder, and wherein said binder has been hardened by a hot gas being blown through said inner layer after the said inner layer has been compressed into contact with the main layer, said inner layer having in its compressed condition a thickness of maximum 10–20% of the outer layer and a density in its compressed condition which is higher than the density of the main layer, thereby contributing to the rigidity of the sleeve.

2. The pipe insulating sleeve according to claim 1, wherein said slits are initially of V-shaped form and are closed when the slab forming the outer layer is bent to form said slitted polygonal surface.

3. A pipe insulation sleeve according to claim 1, wherein the slits extend to a depth of 75–80% of the thickness of the outer layer.

* * * * *